Figure 1:
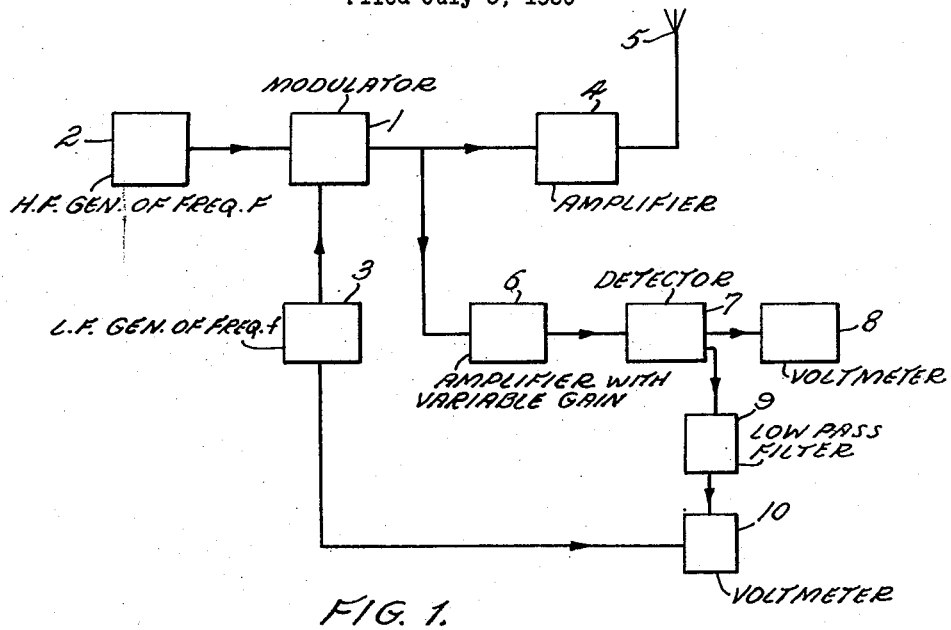

July 6, 1954     A. DÉSENFANT     2,683,253

MODULATION CONTROLLING DEVICE

Filed July 5, 1950

INVENTOR:
ANDRÉ DESENFANT

By Ben. J. Chromy.

HIS ATTORNEY

Patented July 6, 1954

2,683,253

UNITED STATES PATENT OFFICE 2,683,253

MODULATION CONTROLLING DEVICE

André Désenfant, Creteil, France, assignor to Societe Francaise Sadir-Carpentiér, Paris, France, a corporation of France Application July 5, 1950, Serial No. 172,177

Claims priority, application France July 28, 1949

3 Claims. (Cl. 332—39)

My invention has for its object a modulation controlling device and more particularly an arrangement adapted to measure the coefficient of the residual carrier wave, even when very small, in a modulating system providing for the suppression of the carrier wave.

Such an arrangement is particularly applicable for the control of the lateral bands in a radio-beacon transmitter, but the invention is by no means limited to such an application.

When oscillations at a high frequency $F$ are modulated by oscillations at a lower frequency $f$ in a balanced modulating arrangement, there are collected oscillations of the form $$A \cos 2\pi Ft \cos 2\pi ft = \frac{A}{2}[\cos 2\pi(F-f)t + \cos 2\pi(F+f)t]$$

In practice, balanced conditions are difficult to obtain in the modulator and there remains always a residual carrier oscillation; there are thus obtained in practice oscillations of the form $$A \cos 2\pi Ft(a + \cos 2\pi ft) =$$
$$\frac{A}{2}[\cos 2\pi(F-f)t + \cos 2\pi(F+f)t + 2a \cos 2\pi Ft]$$

in which expression the sign of the coefficient $a$ depends on the direction of unbalance of the modulating means.

Now my invention relates chiefly to an arrangement for measuring the coefficient $a$ of the residual carrier wave voltage.

For this purpose, I collect a fraction of the output voltage of the modulator and I apply it to means, including detecting elements, that allow the passage only of beat frequencies of the oscillations of frequencies $F$ $(F-f)$ and $(F+f)$, that is beat frequencies $f$ and $2f$.

There are thus collected alternating current voltage of the form $$E_{2f} = B \cos (2\pi \times 2ft)$$
$$E_f = ka\ B \cos 2\pi\ ft$$

the coefficient $a$ being a constant depending on the system of detection that is used. As a matter of fact $E_{2t}$ is proportional to the product of the voltages of the frequencies $(F-f)$ and $(F+f)$ while $E_f$ is proportional to the sum of the products of the voltages of the frequencies $F$ and $(F-f)$ on the one hand and $F$ and $(F+f)$ on the other hand.

It is thus apparent that the ratio between these two amounts is equal to $ka$, in other words, said ratio provides a measure of $a$ as $k$ has a known value.

My invention is based on this principle and it consists in measuring the ratio between the amplitude of these two oscillations for obtaining the value of the coefficient of the residual carrier wave $a$.

To obtain a measure of this ratio in accordance with a preferred embodiment of my invention, it is essential that the value of this voltage $E_{2t}$ be maintained constant in order that the apparatus may be graduated directly in coefficients of residual carrier waves.

Fig. 1 of accompanying drawings illustrates by way of example and by no means in a limiting sense an arrangement for controlling the balance of a balanced modulating device, according to the present invention.

Figure 2:
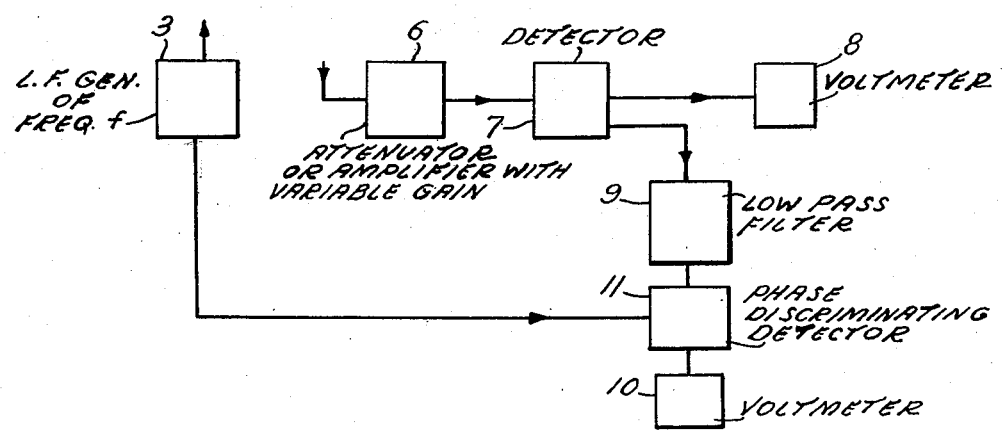

Fig. 2 is a diagram showing a modified form of the invention shown in Fig. 1 incorporating a phase discriminating detector.

The modulator 1 in which the oscillations at a frequency $F$ from the oscillator 2 are modulated through oscillations at a frequency $f$ from the oscillator 3 feeds a suitable utilisation device that may, for instance, be constituted by an amplifier 4 followed by a system of aerials 5. A more or less important fraction of the modulated voltage is removed from the output of the modulator 1 and applied to a high frequency amplifier having a variable gain or else to a high frequency attenuator providing a variable reduction in amplitude, the output of said amplifier or attenuator 6 being connected with detecting means 7. There is thus collected across the output terminals of the detecting means 7 a mixture of the voltages at frequencies $f$ and $2f$. Said mixture is applied on one hand to a measuring instrument 8 of the voltmeter type for instance and, on the other hand, to a low-pass filter 9 the cut-off frequency of which is between $f$ and $2f$ so as to allow the passage only of oscillations at a frequency $f$. The output of the filter 9 is connected with a second measuring instrument 10 that is directly graduated in coefficients of residual carrier waves.

The operator modifies the gain or reduction in amplitude obtained at 6 until the indicator of the measuring instrument 8 registers a constant voltage corresponding to the selected reference value $E_{2t}$. This first adjustment being performed, the indication given by the measuring instrument 10 provides the desired value of the coefficient of the residual carrier wave.

As a matter of fact, the voltage measured by the instrument 8 depends upon both oscillations of frequencies $f$ and $2f$ but the voltage $E_t$ is generally negligible with reference to the voltage $E_{2f}$; in practice, and according to the nature of the measuring instrument 8, it is possible to measure either the peak voltage of the sum of the two oscillations, the voltage amplitudes of which are $E_{2f}$ and $E_f$ or else the effective value of the sum of the voltage of these two oscillations.

As the relative phase between the oscillations at frequencies $f$ and $2f$ remains substantially constant, it is possible through a suitable graduation of the instrument 10 to measure the coefficient of the residual carrier wave, even when said coefficient is comparatively high, by holding the indication given by the instrument at a constant value. When it is desired to retain for all the values of the coefficient $a$ a linear graduation of the instrument 10, a high pass filter, the cut off frequency of which is comprised between the frequencies $f$ and $2f$ so as to allow the oscillations at a frequency $2f$ to pass, is connected between the meter 8 and the detector 7.

By way of a modification in the wiring diagram, the variable gain high frequency amplifier or the high frequency attenuator providing a variable amplitude weakening illustrated at 6 may be replaced by a low frequency variable gain amplifier or a low frequency variable gain attenuator 6' in which case said amplifier or attenuator would be inserted between the detector 7 and the meter 8 and filter 9.

If the indicator 10 is constituted by a simple measuring instrument of the voltmeter type, it provides an indication of the value of the coefficient of the residual carrier wave, but it does not indicate the direction of the unbalance, in other words, the positive or negative sign of the coefficient $a$.

To obtain an indication of this sign, it is possible to use inter alia as a measuring instrument 10 the instrument known in the art as a phase discriminator detector 11 followed by a measuring instrument 10 of the voltmeter type as shown in Fig. 2. In a phase discriminating detector 11, the amplitude and phase (in phase or phase opposition) of the low frequency oscillations at a frequency $f$ collected at the output of the filter 9 are compared to those of a reference oscillation of the same frequency from the original oscillator 3; there is thus collected a direct current voltage porportional to $a$ in magnitude and having the same sign, said direct current voltage being applied to a measuring instrument of the voltmeter type.

It is possible to maintain automatically the voltage $E_{2f}$ constantly equal to a predetermined value by controlling through the voltage measured in the instrument 8 the gain or reduction in amplitude provided by the amplifier or attenuator means 6.

The modulation control means forming the object of the present invention may similarly be used for keeping automatically the coefficient of the residual carrier wave at a value that is lower than a predetermined very low value. It is sufficient in this case to use the direct current voltage from the phase discriminator detector connected to the instrument 10, that is algebraically proportional to the coefficient $a$, for controlling the balance in the balanced modulator 1 through action for instance on the biasing voltage of one or more of the tubes forming part of said modulator.

Numerous modifications may be brought to the arrangement described hereinabove without unduly widening thereby the scope of the invention as defined in accompanying claims.

What I claim is:

1. Apparatus for measuring the ratio of the amplitude of the carrier wave to the amplitude of the side bands of a modulated wave consisting of a high frequency carrier F modulated by a low frequency signal $f$ comprising means for diverting a fraction of the modulated waves consisting of the frequency components F $(F-f)$ and $(F+f)$, a detector for detecting said frequency components to produce voltages having the frequencies $f$ and $2f$, means for separating said voltages and means for separately measuring the amplitudes of these voltages of frequencies $f$ and $2f$ to determine the ratio between said voltage amplitudes.

2. Apparatus for measuring the ratio of the amplitude of the carrier wave to the amplitude of the side bands of a modulated wave consisting of a high frequency carrier F modulated by a low frequency signal $f$ comprising means for diverting a fraction of the modulated waves consisting of the frequency components F $(F-f)$ and $(F+f)$, means for amplifying the diverted fraction of said waves, a detector for detecting said frequency components to produce voltages having the frequencies $f$ and $2f$, means for varying said amplifying means so that said voltage of frequency $2f$ is constant at a predetermined value, and means for measuring the amplitude of the voltage of frequency $f$ to determine the aforesaid ratio.

3. Apparatus for measuring the ratio of the amplitude of the carrier wave to the amplitude of the side bands of a modulated wave consisting of a high frequency carrier F modulated by a low frequency signal $f$ comprising means for diverting a fraction of the modulated waves consisting of the frequency components F $(F-f)$ and $(F+f)$, means for amplifying the diverted fraction of said waves, a detector for detecting said frequency components to produce voltages having the frequencies $f$ and $2f$, means for varying said amplifying means so that said voltage of frequency $2f$ is constant at a predetermined value, means for separating said voltages and means for measuring the amplitude of the voltage of frequency $f$ to determine the aforesaid ratio.

References Cited in the file of this patent

UNITED STATES PATENTS

| Number | Name | Date |
| --- | --- | --- |
| 2,069,934 | Arguimbau | Feb. 9, 1937 |
| 2,329,625 | Kentner | Sept. 14, 1943 |

FOREIGN PATENTS

| Number | Country | Date |
| --- | --- | --- |
| 572,259 | Great Britain | Sept. 28, 1945 |